Sept. 2, 1958 W. F. WENTHE 2,850,620
WELDING ELECTRODES
Filed Oct. 1, 1956
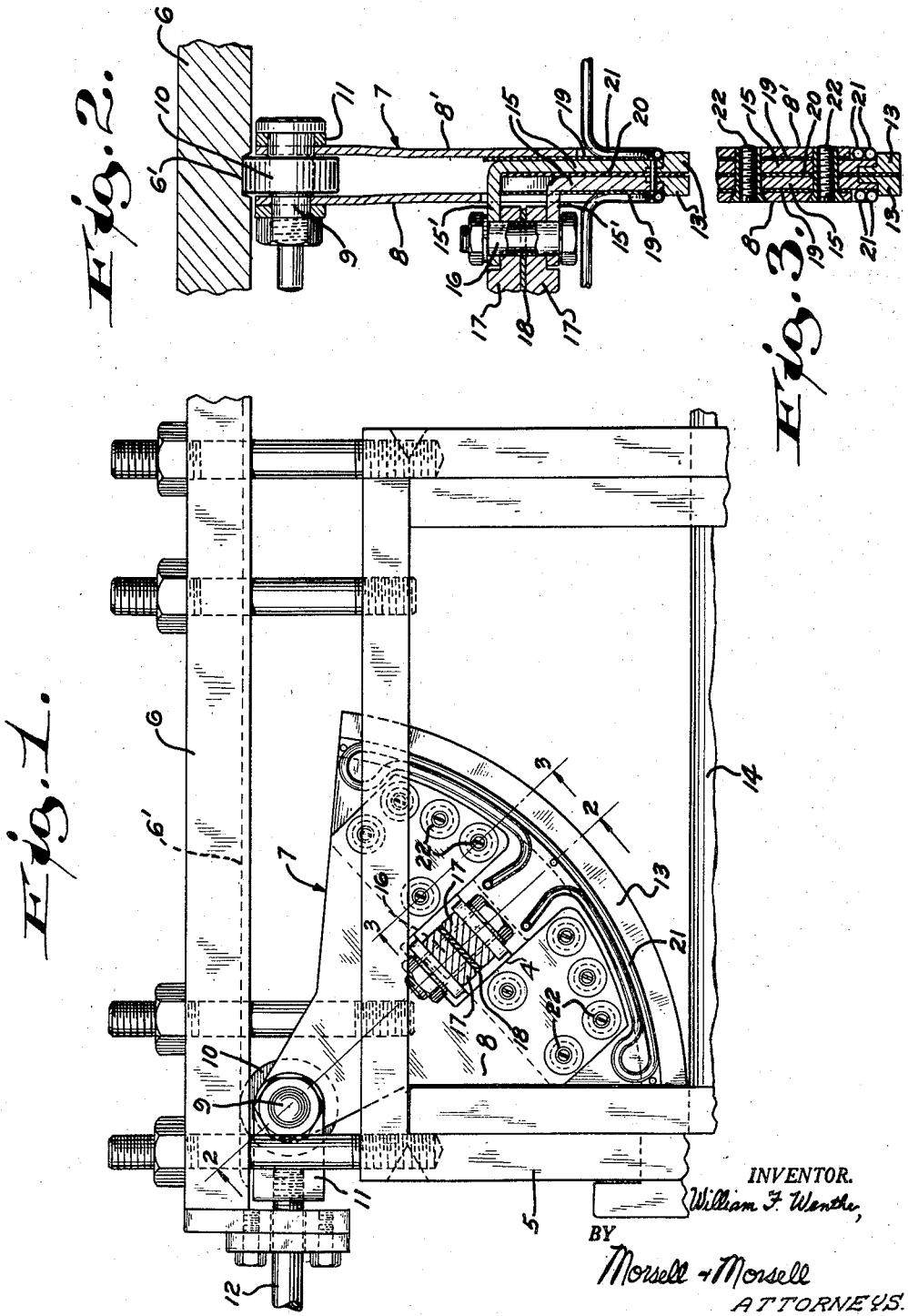
INVENTOR.
William F. Wenthe,
BY
Morsell + Morsell
ATTORNEYS.

United States Patent Office 2,850,620
Patented Sept. 2, 1958

2,850,620

WELDING ELECTRODES

William F. Wenthe, Germantown, Wis., assignor to Wenthe-Davidson Engineering Co., Milwaukee, Wis., a corporation of Wisconsin Application October 1, 1956, Serial No. 612,996

1 Claim. (Cl. 219—120)

This invention relates to improvements in welding electrodes, and more particularly to a segmental welding electrode for resistance welding in machines.

Many types of machines for resistance or spot welding utilize circular, revoluble electrodes having central bearings for the revoluble mounting of the electrodes in the machines. In an electrode of this type the circuit wires which connect with and energize the shoe on the peripheral portion of the electrode must be carried through the central bearing for the electrode assemblage. This arrangement is objectionable in that it renders the electrode bearings vulnerable to wear and deterioration due to heat and necessititates frequent replacement of bearings.

With the foregoing in mind it is a primary object of the present invention to eliminate the above objection inherent in circular electrodes by the provision of a welding electrode assemblage of substantially segmental form and arranged so that the current carrying wires for the energization of the electrode shoes may enter the electrode assemblage remote from the electrode bearing, thereby eliminating wear on the bearings occasioned by excessive heat therein.

A more specific object of the invention is to provide a welding electrode of segmental form adapted to oscillate relative to the work and which makes possible accurate application of pressure as between the electrode surface and the work.

A further, more specific object of the invention is to provide an electrode assemblage of segmental form having a peripheral arc-shaped electrode shoe which is adapted to roll over the work in a smooth manner for accomplishing a weld and which can carry cooling coils adjacent the shoes supplied with a cooling medium through a conduit which, with the current carrying wires, enter the electrode assemblage remote from its bearing.

A further object of the invention is to provide a welding electrode of segmental form which is of very simple construction, which operates quickly and efficiently with uniform pressures, which eliminates deterioration of its bearing, which is strong and durable, and which is well adapted for the purposes described.

With the above and other objects in view, the invention consists of the improved welding electrode and its parts and combinations as set forth in the claim, and all equivalents thereof.

In the accompanying drawing, in which the same reference characters indicate the same parts in all of the views:

Fig. 1 is a fragmentary view of a supporting frame and track portion of a welding machine equipped with the improved segmental welding electrode, the latter being viewed in side elevation;

Fig. 2 is a detail sectional view taken along the line 2—2 of Fig. 1; and

Fig. 3 is a fragmentary detail sectional view taken along the line 3—3 of Fig. 1.

The improved segmental welding electrode is adapted to be incorporated in an automatic resistance welding machine for butt welding which may include a supporting frame 5 adjustably depended from an overhead horizontal guide rail or track 6. The improved segmental welding electrode is designated generally by the numeral 7 and includes a pair of spaced-apart side plates 8 and 8' whose major portions are of segmental shape and which, toward their inner ends, are reduced and apertured to tightly engage shank portions of a bearing shaft 9 which, between the upper or inner ends of the electrode side plates 8 and 8' carries fast thereon a track-engaging roller 10. The shaft 9 which carries the electrode side plates 8 and 8' and the roller 10 is journalled in a longitudinally movable bearing bracket 11 which is secured to the inner end of an hydraulic ram piston 12. The latter extends to and is reciprocated horizontally by a conventional hydraulic ram (not shown) forming a part of the complete welding machine. Reciprocations of the ram piston 12 are effective to cause the roller 10 to ride horizontally in the lower grooved portion 6' of the track 6 whereby the independent, side by side arcuate electrode shoes 13 of the segmental electrode will rock along opposite margins of the seam of a piece of work to be butt welded which is wrapped about an arbor 14. Consequently, when the hydraulic ram piston is projected outwardly or toward the right relative to Fig. 1, the roller 10 will advance along the groove 6' of the track 6 and also cause the segmental electrode 7 to rock in a clockwise direction relative to Fig. 1 to thus roll over and butt weld the seam in the work on the arbor 14. Conversely, a retraction of the hydraulic ram piston 12 will return the roller 10 toward the position in Fig. 1 and cause both the shoe portions of the segmental electrode to rock in a reverse direction. The segmental electrode assemblage, through the side by side electrode shoes, applies pressure to the marginal portions of the work which is wrapped about the arbor. The two electrode shoes and the conductors therefor are all carried by the segmental electrode assemblage. The complete bearing on which the segmental electrode is mounted for its movement is completely unobstructed and is devoid of electrode heating wires and other appurtenances which might subject the bearing to deterioration.

One of the side plates of the segmental electrode, as the plate 8, is provided with a rectangular opening 4 therein through which extend a pair of spaced-apart angularly shaped conductors 15 which, with respect to their portions confined between the side plates 8 and 8' extend down to and electrically connect with the pair of side by side electrode shoes 13 which form the lower periphery of the electrode assemblage. Angularly extended outer portions 15' of the conductors 15 electrically engage and have clamped therebetween by means of a connecting bolt 16, the inner end portions of a pair of metallic electricity conductors 17 which are separated by a layer of insulation 18 and by this means the conductors 15 are supplied with electricity from an external source. Between the side plates 8 and 8' and the conductors 15 there are layers of insulation 19 and also a central layer of insulation 20 separates the conductors 15.

As is shown in the drawing, both sides of the electrode assemblage immediately above the inner margin of the shoes 13 carry water supplied cooling coils 21 which project outwardly of opposite side plates 8 and 8' of the assemblage and connect with a suitable source of cooling medium.

The laminated electrode including the plates 8 and 8', the conductors 15, and the layers of insulation 19 and 20 are held together by suitable screws 22, as shown.

The operation of the segmental electrode has been previously described and it will be observed that both of the side by side electrode shoes 13 are electrically energized through the conductors 15 which extend outwardly of the segmental electrode remote from its bearing and can be conveniently connected with a source of electricity without bringing the wires or connections through the bearing, as is necessary in connection with circular electrodes, or through an arbor or work support.

The improved segmental electrode may be advanced or retracted longitudinally in its tracks 6 and be caused to rock over the work back and forth, and there is no interference or obstruction caused by the connections for the electricity and cooling medium. Consequently, there will be no problem of undue heating of the bearing and resulting deterioration thereof.

The improved segmental welding electrode is of simple and novel construction, is efficient in operation, is rugged and long-lasting, and is well adapted for the purposes described.

What is claimed as the invention is:

In a unitary machine for welding together the adjacent margins of stationary work wrapped about an arbor, a frame, an elevated horizontal track supported by the frame, a stationary arbor supported by the frame spacedly below the track and parallel thereto, a bearing assemblage engaging said track for back and forth movement therealong, a welding electrode assemblage of generally segmental form having an inner end portion pivotally engaging said bearing assemblage and permitting oscillatory movement of the electrode in a vertical plane during back and forth movements of the bearing assemblage relative to the track, a pair of similar, laterally adjacent arcuate work engaging shoes carried by and forming the outer, work engaging edge of the electrode assemblage with the shoes being movable along the adjacent margins of stationary work mounted on said arbor, an independent resistance element within each shoe, and a pair of electricity conductors entering said electrode assemblage remote from its inner end portion and the bearing assemblage, one of said conductors extending within the electrode assemblage to one of said shoe resistance elements and the other of said conductors extending within the electrode assemblage to the other of said shoe resistance elements.

References Cited in the file of this patent

UNITED STATES PATENTS

| | | |
|---|---|---|
| 1,766,229 | Sailor | June 24, 1930 |
| 1,778,628 | Eckman | Oct. 14, 1930 |
| 1,971,217 | Hall | Aug. 21, 1934 |
| 1,973,972 | Allan | Sept. 18, 1934 |